(No Model.) 2 Sheets—Sheet 1.

J. T. BERNARD.
SAW SET.

No. 530,501. Patented Dec. 11, 1894.

Witnesses
Inventor
James T. Bernard
Attorney (No Model.) 2 Sheets—Sheet 2.

J. T. BERNARD.
SAW SET.

No. 530,501. Patented Dec. 11, 1894.

Witnesses
Inventor
James T. Bernard
Geo. R. Hamlin
Attorney.

UNITED STATES PATENT OFFICE.

JAMES T. BERNARD, OF NEAPOLIS, VIRGINIA.

SAW-SET.

SPECIFICATION forming part of Letters Patent No. 530,501, dated December 11, 1894.

Application filed May 15, 1894. Serial No. 511,362. (No model.)

*To all whom it may concern:*

Be it known that I, JAMES T. BERNARD, a citizen of the United States, residing at Neapolis, in the county of Pittsylvania and State of Virginia, have invented certain new and useful Improvements in Saw-Sets; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
This invention aims to provide a tool for setting the teeth of saws by the blow of a hammer operated by a motive power so as to strike each tooth a blow of like force and at a given distance from the end whereby a regular set of the teeth will be obtained, and the saw be enabled to perform its work free from any chocking or unsteady movement and readily follow a line without straining.

The improvement will be more fully set forth hereinafter and claimed and is shown in the annexed drawings, in which—

Figure 1:
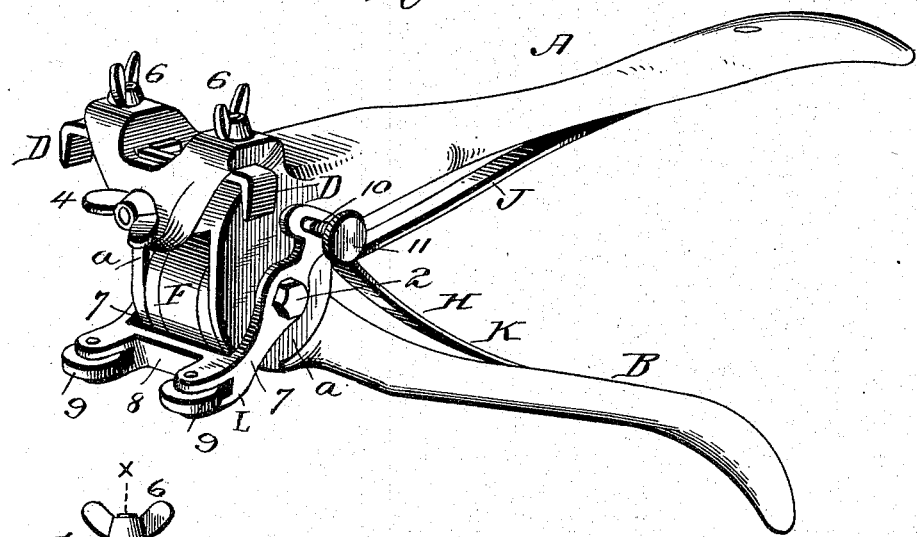
Figure 2:
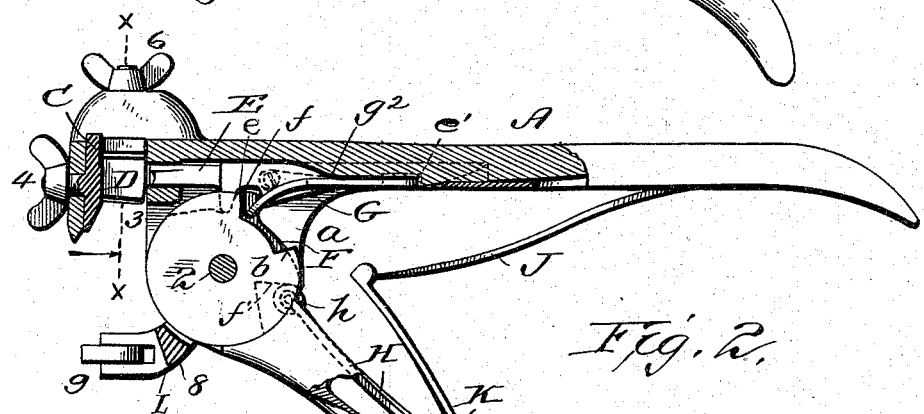
Figure 6:
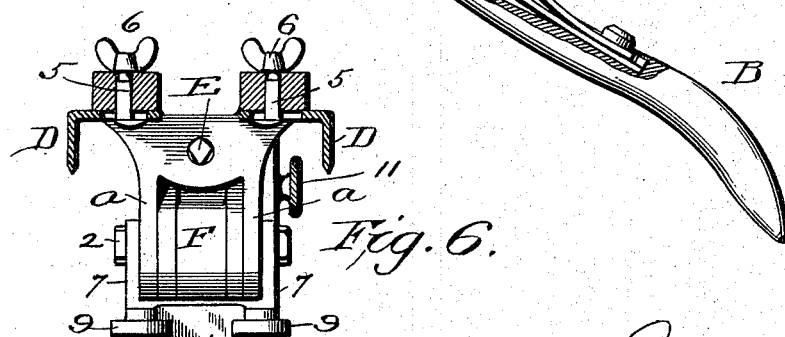
Figure 3:
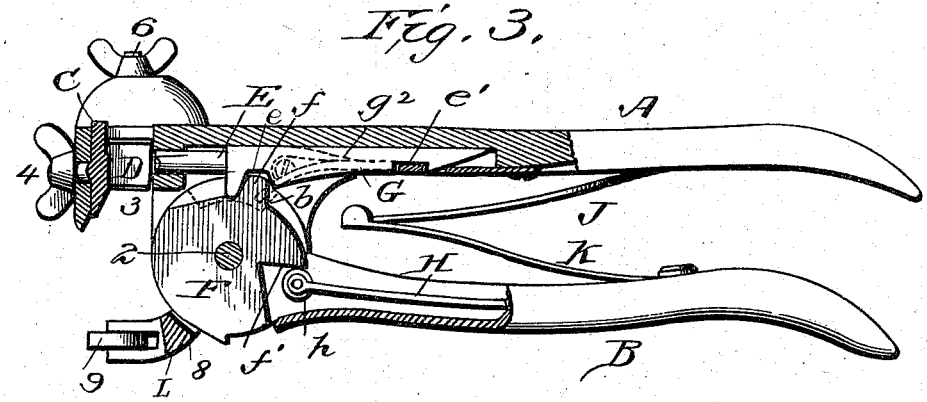
Figure 4:
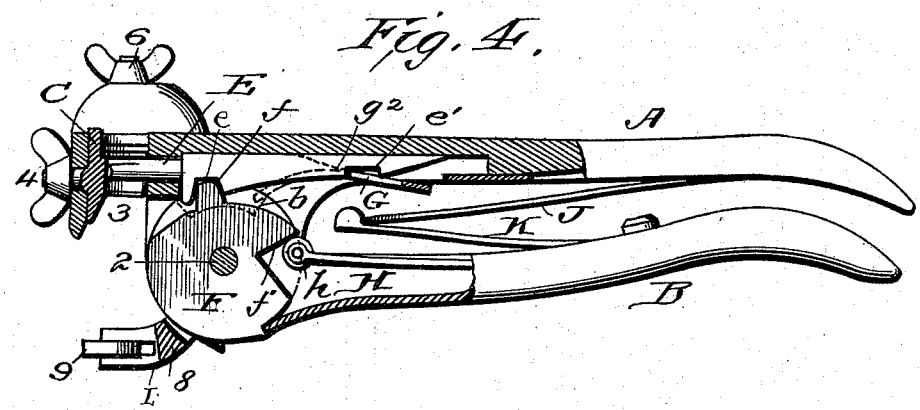
Figure 5:
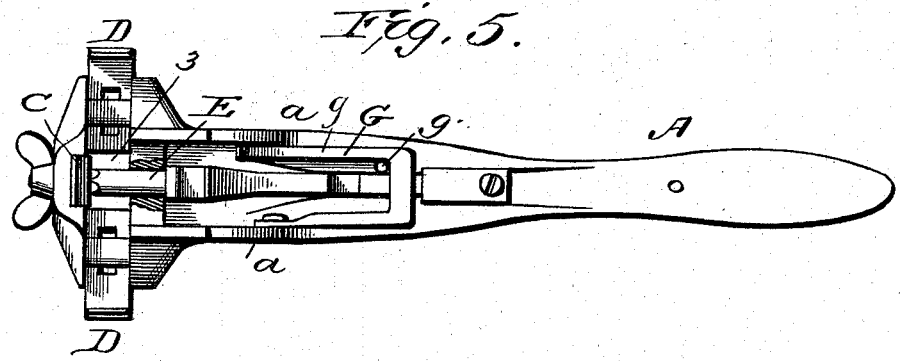

Figure 1 is a perspective view of a tool embodying the invention. Fig. 2, is a longitudinal section showing the normal position of the parts. Fig. 3, is a view similar to Fig. 2, showing the driving spring compressed and the hammer about to be released. Fig. 4, is a view showing the relative disposition of the parts the instant the hammer delivers the blow and before the parts resume their normal position. Fig. 5, is a top plan view of the handle carrying the hammer, the anvil, the gage pieces and the trip, and Fig. 6, is a section on the line X—X of Fig. 2, looking in the direction of the arrow.

Similar letters and figures refer to corresponding parts in the several views.

The letter A indicates a handle having parallel ears $a$ between which a corresponding handle B is pivoted on a pin 2. The end of the handle A is expanded laterally to form a head which is grooved on the inner side as shown at 3. The outer wall of the groove is recessed midway of its ends to provide a seat for an anvil C, which is beveled on the outer end and held in place by a threaded stem which passes through the outer wall of the head and receives a thumb screw 4. This anvil C is of best quality hardened steel to withstand the blows of the hammer in the setting of the saw teeth. The gages D are angle shaped and fitted on the lower wall of the groove 3. These gages have their inner ends slotted to receive the bolts 5 whose flattened heads overlap the sides of the slots to retain the gages in the adjusted position. Thumb nuts 6 on the projecting ends of the bolts, tighten the latter and clamp the gages in the required position. The hammer E works in a groove or recess in the inner side of the handle A and through an opening in the inner wall of the grooved head. A notch $e$ in the side of the hammer receives a tooth $f$ on a cam F to form an interlocking connection. A second notch $e'$ receives a catch G by means of which the hammer is held during the storing of power in the driving spring H. The catch G is approximately U-shaped, one end being secured to the handle, the other end $g$ being free and curved up to be engaged by a shoulder or stop $b$ on the butt of the handle B. The closed end of the catch enters the notch $e'$ in the hammer and is engaged by a pin or projection $g'$ on the handle A. The catch is essentially a spring catch and the curved arm $g$ is adapted to rock upon the fulcrum $g^2$ and when compressed lifts the inner closed end out of engagement with the hammer and the projection $g'$.

The butt end of the handle B is cleft, and between the parallel portions the cam F is located and mounted upon the pin 2. The cam is loosely mounted upon the pin 2 so as to turn thereon under the action of the driving spring when impelling the hammer or returning it to a normal position. A notch or depression $f'$ is formed in the edge of the cam and receives the free end of the driving spring H which engages with its walls. The driving spring H is flat and sufficiently stout to impart to the hammer a force to perform the required work. One end is attached to the handle B, and the other is free and provided with an anti-friction roller $h$ which is adapted to engage with the walls of the said notch $f'$. The handles are normally held separated by springs J and K. The free end of one spring has lugs between which the free end of the other spring works and is held in working position thereby.

A support L for the saw blade is composed of parallel side bars 7 and a cross bar 8. The ends of the side bars 7 are curved and notched to receive rollers 9. These rollers come about opposite the groove 3 and with the anvil C properly position the saw when setting the teeth. Obviously, by varying the relative position of the rollers the required set to be given the saw teeth can be had. One of the side bars is extended beyond the pin 2 and terminates in a slotted segment 10, through which a binding screw 11 passes to secure the support in the proper position.

The operation of the invention is as follows: The saw to be set is inserted in the groove 3 and rests upon the anvil C and the rollers 9, the gages D being adjusted to fit snugly between the teeth and bring the tooth to be set opposite the end of the hammer. It will be understood that the handle A is relatively fixed and that the catch G retains the hammer in place during the storing of power in the driving spring. The cam F having positive engagement with the hammer by means of the notch $e$ and the projection $f$, is also retained during the storage of force in the driving spring. On pressing the handle B toward the handle A the free end of the spring H will engage with the upper wall of the notch $f'$ and be retained till the handle B reaches the proper point in its movement when the stop or shoulder $b$ will engage with the member $g$ of the catch G and release the latter from the hammer. See Figs. 3 and 4. The instant the hammer is released the cam is turned on the pin 2 and projects the hammer forward by reason of the spring H regaining itself. On releasing the handle B it will be returned to a normal position by the action of the springs J and K. As the handle B is assuming a normal position the spring H will engage with the lower wall of the notch $f'$ and return the cam and the hammer to a normal position for a repetition of the operation just described on again compressing the handle B.

Having thus described my invention, what I claim as new, and desire to secure by Letters Patent, is—

1. In a saw-set, the combination of two handles pivoted together, one of the handles having a grooved head and an anvil in the outer wall of the groove, a slidable hammer carried by the handle having the grooved head, a cam loosely mounted on the pivotal connection of the handles and having positive connection with the slidable hammer, a driving spring attached at one end to the operating handle and having its free end in engagement with the said cam, and a catch to hold the hammer during the storing of force in the driving spring and adapted to be released by a stop on the operating handle, substantially as described.

2. In a saw-set, the combination of two handles pivoted together, one of the handles being provided with a grooved head having an anvil to receive a saw blade, a hammer carried by the handle having the said grooved head and adapted to move lengthwise thereof, a driving spring for operating the hammer, a catch adapted to rock on a fulcrum and have engagement with the hammer, a cam mounted on the pivotal support of the handles and having engagement with the hammer and the driving spring, and a stop on one of the handles to engage with and release the said catch, substantially as set forth.

3. In a saw-set, the combination of two handles pivoted together, one of the handles being provided with a grooved head having an anvil to receive a saw blade, a hammer carried by the handle having the said grooved head and adapted to move lengthwise thereof, a driving spring for operating the hammer, an approximately U-shaped spring catch having one end fixed to one handle, the other end being curved and adapted to rock upon a fulcrum on the said handle and having the closed end adapted to engage with the hammer, and a stop provided on the other handle to engage with the curved end of the catch and release it from the hammer, substantially as specified.

4. In a saw-set, the combination of two handles pivoted together, one of the handles being provided with a grooved head to receive a saw blade, a hammer carried by the handle having the said grooved head and adapted to move lengthwise thereof, a catch to hold the hammer during the storing of its motive power, a cam mounted upon the pivotal support of the handles and having a tooth in positive engagement with the hammer, and having a recess in its edge, a driving spring attached at one end to the other handle and having at its free end an anti-friction roller to engage with the said recess in the cam, and a stop provided on the handle carrying the spring to release the said catch, substantially as set forth.

5. In a saw-set, a grooved head to receive a saw blade, saw setting devices, and a support for the outer edge of the saw comprising side bars pivoted to the tool and having rollers in their outer ends, a connecting cross bar uniting the side bars, a slotted segment forming a prolongation of one of the side bars, and a binding screw to secure the support in the required adjusted position, substantially as described.

In witness whereof I affix my signature in presence of two witnesses.

JAMES T. BERNARD.

Witnesses:
D. B. GARDNER,
J. M. BARKER.